(12) United States Patent
Shih et al.

(10) Patent No.: US 11,238,162 B1
(45) Date of Patent: Feb. 1, 2022

(54) METHOD FOR SYSTEMATICALLY AND OBJECTIVELY ASSESSING SYSTEM SECURITY RISK

(71) Applicant: Raytheon Company, Waltham, MA (US)

(72) Inventors: William Tin Wun Shih, Whittier, CA (US); William Posey, Palos Verdes Estates, CA (US); Mark Youhanaie, Westchester, CA (US)

(73) Assignee: Raytheon Company, Waltham, MA (US)

( * ) Notice: Subject to any disclaimer, the term of this patent is extended or adjusted under 35 U.S.C. 154(b) by 307 days.

(21) Appl. No.: 16/454,744

(22) Filed: Jun. 27, 2019

(51) Int. Cl.
*G06F 21/57* (2013.01)
*G06F 16/22* (2019.01)

(52) U.S. Cl.
CPC ............ *G06F 21/577* (2013.01); *G06F 16/22* (2019.01); *G06F 2221/033* (2013.01); *G06F 2221/034* (2013.01)

(58) Field of Classification Search
CPC .. G06F 21/577; G06F 16/22; G06F 2221/034; G06F 2221/033
See application file for complete search history.

(56) References Cited

U.S. PATENT DOCUMENTS

| | | | | |
|---|---|---|---|---|
| 2009/0024663 | A1* | 1/2009 | McGovern | G06F 21/577 |
| 2013/0111547 | A1* | 5/2013 | Kraemer | G06F 21/56 726/1 |
| 2015/0365436 | A1* | 12/2015 | Shenefiel | H04L 63/102 726/1 |
| 2017/0357812 | A1* | 12/2017 | Lerner | G06F 21/577 |

* cited by examiner

*Primary Examiner* — Meng Li
(74) *Attorney, Agent, or Firm* — Daly, Crowley, Mofford & Durkee, LLP

(57) ABSTRACT

A method for developing an information system specification includes: performing, from a design specification for an information system having a functional and structural component, an information assurance component and an anti-tamper component, a trust analysis identifying which components of the information system the information system must trust to enforce a security policy and providing a trust score; performing for each system element in the information system a trustworthiness assessment and providing a trustworthiness score; performing mitigation to reduce a trust gap as determined from the trust score and the trustworthiness score; performing a vulnerability assessment to identify residual vulnerabilities determined from the vulnerability assessment; mitigating the residual vulnerabilities by designing preventive and reactive countermeasures to reduce the number of residual vulnerabilities; designing and applying anti-tamper techniques to cyber RCPI to ensure countermeasure effectiveness; assessing the countermeasures applied to the information system; assessing the security risk associated with the remaining residual vulnerabilities to determine if such residual vulnerabilities are acceptable to protect critical data and technology in the information system; and changing and updating system requirements for the information system as required by the designing preventive and reactive countermeasures step and the designing and applying anti-tamper techniques step.

17 Claims, 5 Drawing Sheets

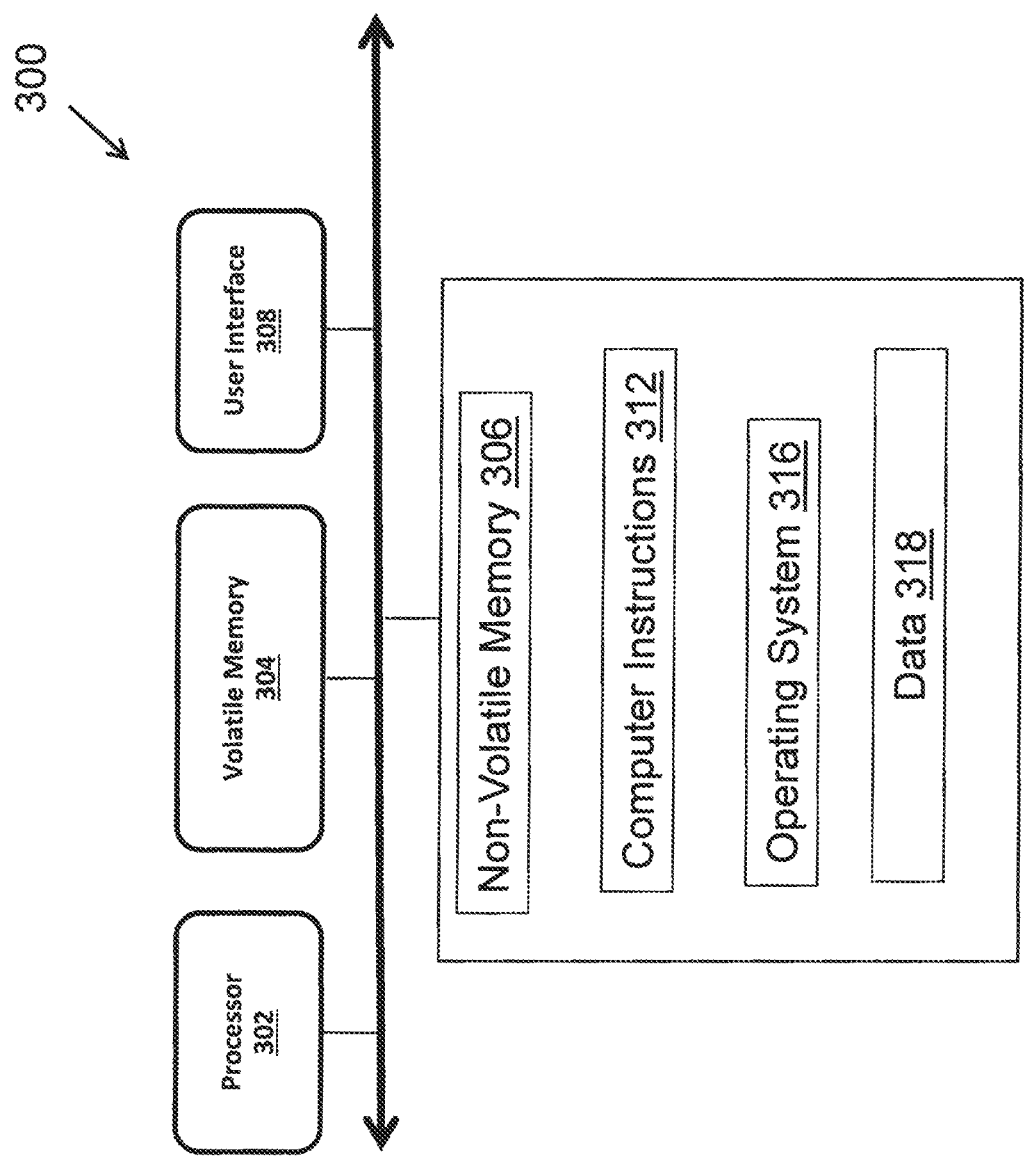

METHOD FOR SYSTEMATICALLY AND OBJECTIVELY ASSESSING SYSTEM SECURITY RISK

FIELD OF THE INVENTION

This disclosure relates generally to system integrity assurance systems and more particularly to a system and method for developing a performance based requirements specification that includes system integrity assurance requirements.

BACKGROUND

As is known in the art, information systems currently face attacks by entities with differing system access and objectives. For example, reverse engineering, operational cyber attacks and non-operational cyber attacks are forms of compromising and exploiting information systems. With reverse engineering, physical access on a bench or test bed can be accomplished during post production in non-operational environments to potentially compromise or exploit information in an information system. An operational cyber attacker may gain access to the information system over a network when the information system is in operation. A non-operational cyber attacker may gain access to the information system during the design of the system, during manufacturing or storage of the system.

Current threats against information systems include reverse engineering, operational cyber threats (as embedded systems are connected to networks) and non-operational threats, given the trend towards offshore sourcing and greater component complexity. These threats to information systems are no longer isolated; for example, supply chain attackers can assist both reverse engineering and operational cyber attacks by inserting backdoors into the system. Stovepiped defenses are insufficient to address such threats and it is desirable to provide an integrated process to address and reduce the effectiveness of these integrated threats.

SUMMARY

In accordance with the present disclosure, a method for developing an information system specification includes: performing, from a design specification for an information system having a functional and structural component, an information assurance component and an anti-tamper component, a trust analysis identifying which components of the information system the information system trusts to enforce a security policy and providing a trust score; performing for each system element in the information system a trustworthiness assessment and providing a trustworthiness score; performing a trust gap mitigation; performing a vulnerability assessment to identify residual vulnerabilities determined from the vulnerability assessment; mitigating the residual vulnerabilities by designing preventive and reactive countermeasures to reduce the number of residual vulnerabilities; designing and applying anti-tamper techniques to critical data requiring protection to ensure countermeasure effectiveness; assessing the countermeasures applied to the information system; assessing the security risk associated with the remaining residual vulnerabilities to determine if such residual vulnerabilities are acceptable to protect critical data and technology in the information system; and changing and updating system requirements as required by the designing preventive and reactive countermeasures step and the designing and applying anti-tamper techniques step. With such a technique, system requirements for a needed information system can be developed to reduce the vulnerabilities that will exist in the resulting information system.

In accordance with the present disclosure, a system integrity assurance system includes: a trust analysis module to capture and store information, from a design specification for an information system having a functional and structural component, an information assurance component and an anti-tamper component, as to which components of the information system the information system must trust to enforce a security policy and to provide a respective trust score; a trustworthiness assessment module to capture and store for each system element in the information system a trustworthiness assessment and to provide a respective trustworthiness score such that trust gap mitigation can be performed for selected system elements as determined by the respective trust score and trustworthiness score; a vulnerability assessment module to capture and store information as to any identified residual vulnerabilities determined from a vulnerability assessment such that residual vulnerabilities can be mitigated by designing preventive and reactive countermeasures to reduce the number of residual vulnerabilities and by designing and applying anti-tamper techniques to critical data requiring protection to ensure countermeasure effectiveness; a countermeasure effectiveness assessment module to assess the countermeasures applied to the information system; and a security risk assessment module to capture and store information to assess the security risk associated with the remaining residual vulnerabilities to determine if such residual vulnerabilities are acceptable to protect critical data and technology in the information system and to provide a list of needed changes to the system requirements to reduce the vulnerabilities of the information system.

The details of one or more embodiments of the disclosure are set forth in the accompanying drawings and the description below. Other features, objects, and advantages of the disclosure will be apparent from the description and drawings, and from the claims.

DESCRIPTION OF DRAWINGS

FIG. 4 is a block diagram of general purpose computer used to implement the system integrity assurance system. Like reference symbols in the various drawings indicate like elements.

DETAILED DESCRIPTION

Before departing on a detailed description of the invention, it may be helpful to review some general concepts and terms to be used in the disclosure. Trust is the level of reliance placed on a system element by the system design; that it will behave as expected. Trustworthiness is the level of confidence established in a system element; can be viewed as the likelihood a component will not fail to behave/perform as designed/expected, for example a supply chain compromise. A Trust Gap arises when components are deemed insufficiently trustworthy as compared to their trust.

A trust gap requires further mitigation by reducing the trust required (such as by design changes) or by increasing trustworthiness (such as by supply chain mitigation).

Vulnerability Assessment is the steps required to assess the weakness in the system such that the system can be compromised or exploited. Residual Vulnerabilities are vulnerabilities in the system after countermeasures are applied. It provides objective measure of the "goodness" of a security solution.

Cyber Resident Critical Program information (RCPI) is countermeasure information, that if known, would aid attacker in formulation of an attack. Preventative Countermeasures (PCMs) are countermeasures that exist to reduce the exposure to threats. Reactive Countermeasures (RCMs) are countermeasures that exist that are invoked in response to a detected threat.

Countermeasure Effectiveness Assessment is the steps required to assess the effectiveness of countermeasures taken against a threat. Successful Attack Trajectories determine a "work factor" of a successful attack; similar as Successful Tamper Trajectories (STT) as applied to anti-tamper technologies, but applied to cyber attacks.

Figure 1:
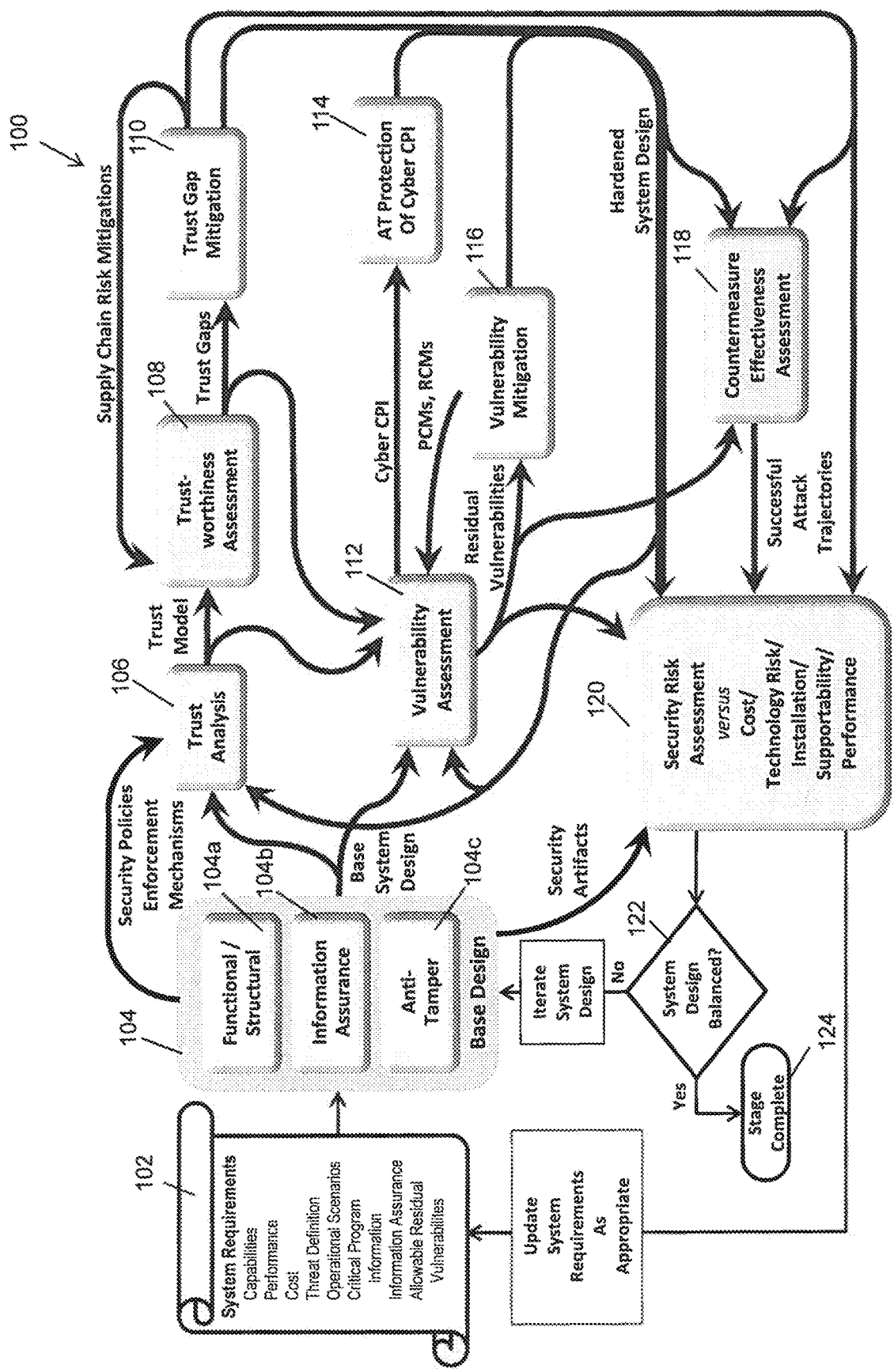
FIG. 1 is a flow chart describing a method for developing a performance based requirements specification.

Referring now to the FIG. 1, a flow chart describing a method 100 for developing a performance based requirements specification is shown. When a need for an information system exists a system requirements document is created to describe the functional requirements of the needed system. What is often lacking is system integrity assurance requirements. As shown in block 102, a System Requirements Specification is developed and includes the following: (a) Functional Requirements to include the system's capabilities and performance requirements (e.g. what it does); (b) Threat Environment Requirements to include Threat Definition (attacker capabilities and access level) and Operational Scenarios (how and where the system is used); (c) Protection Requirements to include the critical program information and how it needs to be protected. Critical Program Information (CPI) includes the critical data requiring information assurance (IA) and resident critical program information requiring anti-tamper (AT) protection. IA Protection includes InfoSec equities and criticality levels (CIA) and baseline IA controls (requirements) derived from Assessment & Authorization (A&A) standards as dictated by NIST 800-53 needed to protect those equities. AT Protection includes Resident Critical Program Information (RCPI) equities and criticality levels (e.g. modification-sensitive, sight-sensitive) and the Allowable Residual Vulnerabilities (ARVs) deemed acceptable to protect the RCPI equities within cost objectives.

The present disclosure teaches a technique (sometimes referred to as a system integrity assurance (SIA) methodology) to develop a performance-based requirements specification using the steps as to be described. An initial system requirements specification is developed and then using the techniques described herein a requirements specification is developed using the system integrity assurance methodology with the objective of having only Allowable Residual Vulnerabilities (ARVs) wherein the methodology characterizes all RVs in the system and data owners and stakeholders determine the ARVs.

Figure 1A:
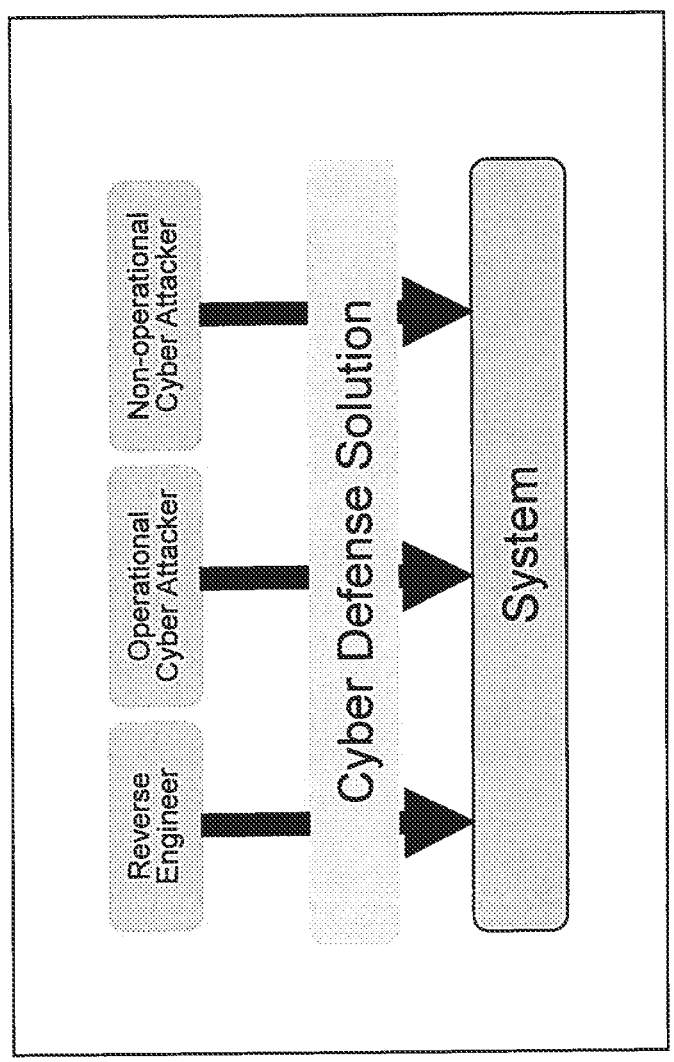
FIG. 1A is a diagram describing the elements affecting an information system that require countermeasures.

Referring momentarily to FIG. 1A, it should be appreciated that reverse engineering techniques, operational cyber attacks and non-operational cyber attacks can be used to compromise and exploit the information system. To minimize the threat to the system, a specification of the cyber and reverse engineering threat and security objectives against the threat must be included in the system requirements. The system integrity assurance methodology integrates IA, AT, and supply chain risk mitigation (SCRM) processes into the development of a system requirements specification and creates an integrated security solution for addressing the integrated threat which includes leveraging synergies between security disciplines. The methodology incorporates objective criteria for specifying and evaluating the effectiveness of these solutions to include developing requirements specifications and base design using existing functional, IA, AT, supply chain risk mitigation processes; applying countermeasures (CMs) to mitigate the integrated threat and measure results via residual vulnerabilities; evaluating residual vulnerability acceptability and update requirements specifications as needed as to be described further hereinafter.

Referring now again to FIG. 1, as shown in step 104, system designers implement system requirements using existing engineering processes and assessment and authorization standards implementing functional/structural step 104a, information assurance (IA) step 104b and anti-tamper (AT) step 104c and their associated requirements working collaboratively to develop a base design. The base design includes documented security policy enforcement mechanisms. When the base design is presented with an integrated threat, SIA Methodology identifies additional countermeasures as needed. Such a process may result in updating requirements/design to fill gaps not addressed by stovepiped processes.

Once a preliminary base design is completed, a trust analysis is performed as shown by trust analysis step 106 and a trust score is provided for each component or system element. Trust is the level of reliance placed on a system element by the system design; that it will behave as expected Trust can be viewed as component criticality—the impact on system security if/when a component is compromised or fails. Two factors contribute to trust: Severity and Dispersion. Severity is defined as the worst case consequences of any security policy violations caused by the component(s) failure. Examples include data spills, access violations, data corruption, etc. Trust analyses assess the consequences when the components enforcing a security policy are compromised. Severity only addresses security policy criticality; entire system treated as mission critical for this exercise. Dispersion is defined as the number of distinct components that must fail in order for a violation to occur. If only one component enforces a security policy, it inherits entire trust burden. If multiple components must all fail for a policy violation to occur, the trust burden is equally dispersed, reducing the trust required of each component.

Trust analysis identifies which components the system trusts to enforce each security policy and analysis is guided by system security policies. Security policies put constraints on system transactions necessary to protect the confidentiality, integrity, and availability of data (e.g. domain separation). Trust analysis requires detailed knowledge of the specific system design to include all enforced security policies, all hardware and software components, and how system components interact to enforce each security policy. Each of the above are described in the system design documents. This information enables designers to identify which components enforce which security policies and the consequences on each security policy of a component failure. Trust assessment is wholly dependent on system design and how components are employed to enforce security policies.

To calculate a trust score for each component or system element, the trust score is determined by the severity times the dispersion attributed to that component. The trust score is an objective measure of trust. Here, the severity is determined by the policy violation consequences and is given a score. A score of [3] or High is given when a security system/artifact corruption or data spill across domains will occur. A score of [2] or Medium is given when there is user data corruption or loss. A score of [1] or Low is given when the is a domain access policy or resource quota violation. A score of [0] or No is given if the component does not enforce any security policies. The dispersion is determined by the number of components that must fail in order for policy violation to occur. A score of [3] is given for 1 component, a score of [2] is given for 2 components and a score of [1] is given when there are 3 or more components. The number in the square brackets list severity and dispersion scores. A trust score is assigned to components; if a component enforces multiple security policies, assign maximum score of the policies it enforces. The trust score ranks components as guide to trustworthiness assessment as to be described.

Trustworthiness is the level of confidence established in a system element. It can be viewed as the likelihood a component will not fail to behave or perform as designed or expected (e.g. supply chain compromise). Three major factors contribute to trustworthiness: vendor, pedigree and complexity. The vendor factor is determined by the company(s) manufacturing or authoring the component, country(s) of origin, and the vendors processes for securing their supply chain throughout the chain of custody from development, manufacturing, product handling, to operational use; essentially the vendors reputation for delivery of reliable, unaltered components. The pedigree is determined by previous, current, and planned component usage and previous evaluations of any type; essentially, the components exposure to scrutiny. The complexity is determined by the number of gates or lines of code and functional complexity; essentially the probability of finding any inserted malware in the component.

Supply chain attacks aimed at enabling operational attacks include: targeted hardware and software malware insertion, i.e. insert malware to compromise a specific product; untargeted hardware and software malware insertion, i.e. add exploitable vulnerability to system (e.g. add backdoor to security software); system discovery meaning discover existing, undocumented features which could be exploited in future RE or cyber attacks; and insider attack meaning trusted employees add exploitable vulnerabilities to a system. It should be noted that trustworthiness does not need to be assessed if trust is low.

As shown in step 108, a trustworthiness assessment is performed for each component or system element. Initially during phase 1, a preliminary assessment is performed where the use country of origin and vendor is used to assign a preliminary trustworthiness "score" to each component. For example, components developed in-house using trusted processes have a high level of trustworthiness. Also, components wholly developed within the US by reputable companies with known supply chain protections may be deemed trustworthy with no further evaluation. Components deemed trustworthy in this phase have High trustworthiness. Components not deemed having High trustworthiness proceed to phase 2, where a detailed vendor investigation is performed. Assess whether risk vendor will deliver compromised components by assessing factors such as facility location, company owners, work force citizenship, supply chain mitigations, and reputation using a service such as Telemus. Components are assigned a trustworthiness score of [1] Low, [2] Medium, or [3] High. Components deemed insufficiently trustworthy as compared to their trust score after Phase 2 are defined as having a trust gap. Identified trust gaps require further mitigation.

As shown by step 110, trust gap mitigation must performed for components having a trust gap. Trust gaps can be mitigated by either decreasing trust required (via design changes) or increasing trustworthiness via Supply Chain Risk Mitigation (SCRM) of a component. For example, design changes that reduce required trust include: Restrict Privileges—restrict system or components such that less trust is required (Example: restrict a program from accessing memory outside its scope); Apply Redundancy—add components to reduce consequence of failure or improve detection of compromise (Example: share trust across multiple components). Examples of supply chain risk mitigation include securing the supply chain to improve the probability that part meets spec. For example, choose an alternate component source to change component supplier to a source that is more trustworthy (Example: purchase memory part from United States instead of China). Perform vendor inspections; send independent inspectors to verify manufacturing/supply chain process. Perform blind buys by obfuscating purchaser of part to avoid targeted supply chain attack. Additionally supply chain technical mitigations can be performed to verify part meets specification. Perform device specific evaluations, such as performed by the DARPA TRUST program, to verify device design. Perform functional device screening to conduct functional tests to verify part operates as expected, or perform a malware insertion scan to conduct functional tests to check for undocumented features. Once SCRM is done it must flow back to the trustworthiness assessment step 108 and be reaccomplished.

After the trustworthiness assessment step 108 is completed, a vulnerability assessment step 112 is done. Vulnerability assessment identifies and documents a system's residual vulnerabilities based on the integrated threat. It uses a System Vulnerability Model (SVM) to systematically and completely model the system and its residual vulnerabilities. The System Vulnerability Model (SVM) must: objectively identify the system's attack space; iteratively identify the residual vulnerabilities of the system as countermeasures are applied and identify information that must be protected to ensure countermeasure effectiveness (Cyber CPI). An Object Based Vulnerability Model (OBVM) available from Raytheon Company can be used to perform the vulnerability assessment. Alternatively, the SVM can be based on an attack library.

The inputs to the vulnerability assessment would include the Base System Design from step 104. The system design after applying AT and IA methodologies based on requirements specifications is used to develop a model of system vulnerabilities. The Trust Model identifies the criticality of components and is used to identify the criticality of residual vulnerabilities when assessing risk. The trust gaps identify components where the trustworthiness is inadequate compared to the trust required. The latter are used to identify where countermeasures need to be applied to mitigate supply chain risk. Once the PCM, RCM, and design changes are applied to mitigate cyber vulnerabilities, the remaining residual vulnerabilities are identified. Anti-Tamper Countermeasures performed in response to the countermeasures applied to Cyber RCPI (discussed below) must be assessed to identify residual vulnerabilities of these added AT countermeasures.

The output from the vulnerability assessment includes; (a) Residual Vulnerabilities (RVs) meaning the remaining system vulnerabilities after countermeasures have been applied; and (b) Cyber RCPI meaning the cyber countermeasure information, that if known, would aid attacker in formulation of an attack.

As shown in vulnerability mitigation step 116, vulnerability mitigation is performed to mitigate cyber threats via technical and procedural countermeasures. Countermeasures are added to mitigate residual vulnerabilities identified by the vulnerability assessment step 112. Vulnerability Mitigation involves designing preventative and reactive countermeasures (PCMs and RCMs) to reduce residual vulnerabilities; Preventative Countermeasures (PCMs) to prevent attacks from occurring; and Reactive Countermeasures (RCMs) to detect the effects of attacks and react to restore system integrity and/or functionality. The PCMs, RCMs, and design changes that are implemented are flowed back to the Vulnerability Assessment step 112 for evaluation.

As shown in AT Protection of Cyber RCPI step 114, anti-tamper techniques are applied to critical data requiring protection to ensure countermeasure effectiveness. Cyber RCPI is protected by AT in the same manner as other CPI. Cyber RCPI can be protected as modification-sensitive (MS) or sight-sensitive (SS) data. Apply the AT Spec Methodology or a similar methodology to protect this information, resulting in RVs for this RCPI.

In countermeasure effectiveness assessment step 118, the countermeasures applied to the system to include hardened system design, design changes for trust gap deficiencies and the residual vulnerabilities are objectively assessed. The hardened system design includes all PCMs, RCMs, and design changes in the context of the system. The design changes for trust gap remediation include countermeasures deployed to improve trustworthiness of the system. Residual Vulnerabilities include the remaining system vulnerabilities after countermeasures have been applied. The goal of the countermeasure effectiveness assessment step is to provide equity owners the ability to assess the risk of system exploitation and the risk of data confidentiality, integrity, and availability compromise. The countermeasure effectiveness is determined objectively by constructing Successful Attack Trajectories (SATs) to show successful avenues of attack that take advantage of RVs; and, if possible, determines "work factor" of a successful attack. Successful Attack Trajectories are similar to AT Successful Tamper Trajectories (STT), but applied to cyber attacks. Successful Attack Trajectories do not need to be comprehensive but simply need to represent the paths relevant to assessing the RVs.

Figure 3:
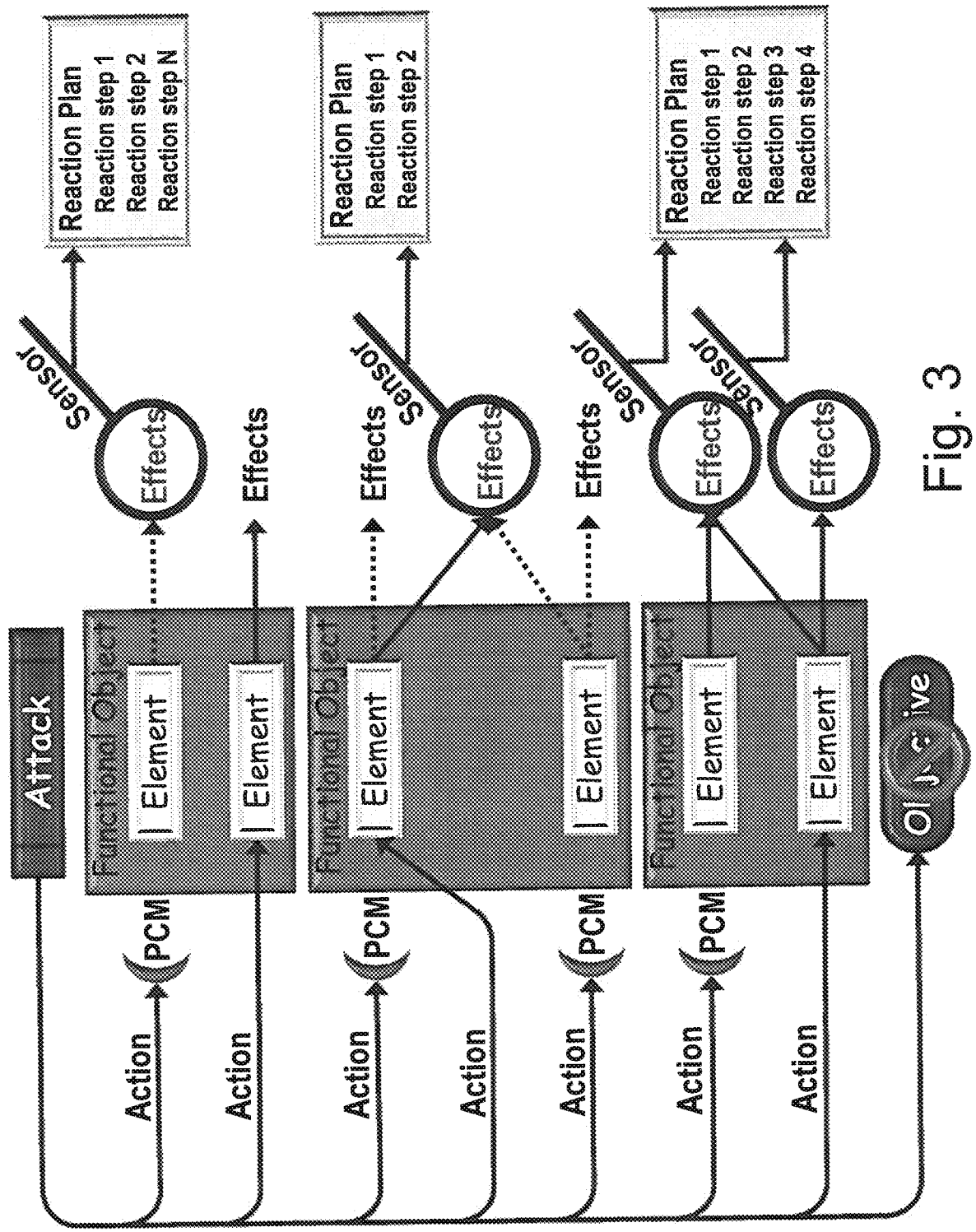
FIG. 3 is a diagram showing the effects of blocking steps required to reach an objective.

Referring now to FIG. 3, a diagram illustrating the countermeasure effectiveness after countermeasures are applied is shown. Starting at the top, an attacker would need to perform the action shown on a particular element to get the desired effect. For certain elements, a preventive countermeasure (PCM) can be applied to block the action on the element. For the elements that have residual vulnerabilities that cannot be blocked by a PCM, a sensor can be useful to monitor the effect and when detected, a reactive countermeasure (RCM) can be invoked with a reaction plan to overcome the effects of the action. The latter prevents the objective from being obtained.

Some examples of Successful Attack Trajectories (SATs) of exploiting confidentiality such as a data spill from the high side to the low side include a direct connection where the attacker inserts malware on the high side, inserts malware on the low side, transfers data from the high side to the low side and exports the data. It should be appreciated unless the attacker is able to complete all the steps to reach the objective, the objective is not obtained. So preventing any one of the steps would stop the objective. Inserting a covert channel to extract data is another SAT. Still another example of an SAT is a security infrastructure attack where the attacker corrupts the security infrastructure, inserts malware on the high side, transfers data and exports the data. Further still another example of a SAT is an unknown interface where a software defect exists, software malware is inserted, a hardware defect exists, hardware malware is inserted either in architecture or out of architecture.

It should be appreciated the characteristics of the countermeasure effectiveness assessment is dependent on the system and cannot be generalized for a product. The objectives are system dependent and require knowledge of user applications in the system. For example, do applications download executable code or applets or are there external interfaces into the system normally in use? The Successful Attack Trajectories represented by a string of Residual Vulnerabilities are helpful in accomplishing the assessment. The Strategic Attack Trajectories can be consolidated by classes of attacks. For example, exporting data via PCI memory bus or IIC interface are both external interfaces.

Referring again to FIG. 1, in security risk assessment step 120 we assess whether the residual vulnerabilities discovered by the vulnerability assessment step are acceptable to protect critical data in the system. Has the risk been mitigated to an acceptable level? Security Risk is compared against cost, technical risk, installation, supportability, and performance to determine proper design balance (i.e., what is the value proposition?). Equity owners determine whether their data is sufficiently protected; are the residual vulnerabilities acceptable? Equity owners, customers, users and system designers jointly assess system security compared with cost, technology risk, installation, supportability and performance (CRISP). If residual vulnerabilities are unacceptable, the process is repeated until the residual vulnerabilities are acceptable as shown in decision tree 122. The process is then complete as shown in step 124.

Any required changes to the Allowed Residual Vulnerabilities (ARVs) are incorporated in the system requirements specification and such changes may require additional cycle through process for any modifications to system design due to the changes to the system requirements specification. This is a balancing effort. If the RVs of the system are not ARVs as stated in the specification then either the specification or the design has to change. The Security Risk Assessment vs. CRISP determines which one has to change.

It should now be appreciated system integrity assurance according to the disclosure provides an objective method for identifying, addressing, and evaluating risk of the integrated threat. The requirements specification provides system designers with bounded scope and design testability. The residual vulnerabilities and successful attack trajectories provide equity owners objective measure of security system adequacy and the artifacts provide documentation for certification review.

Figure 2:
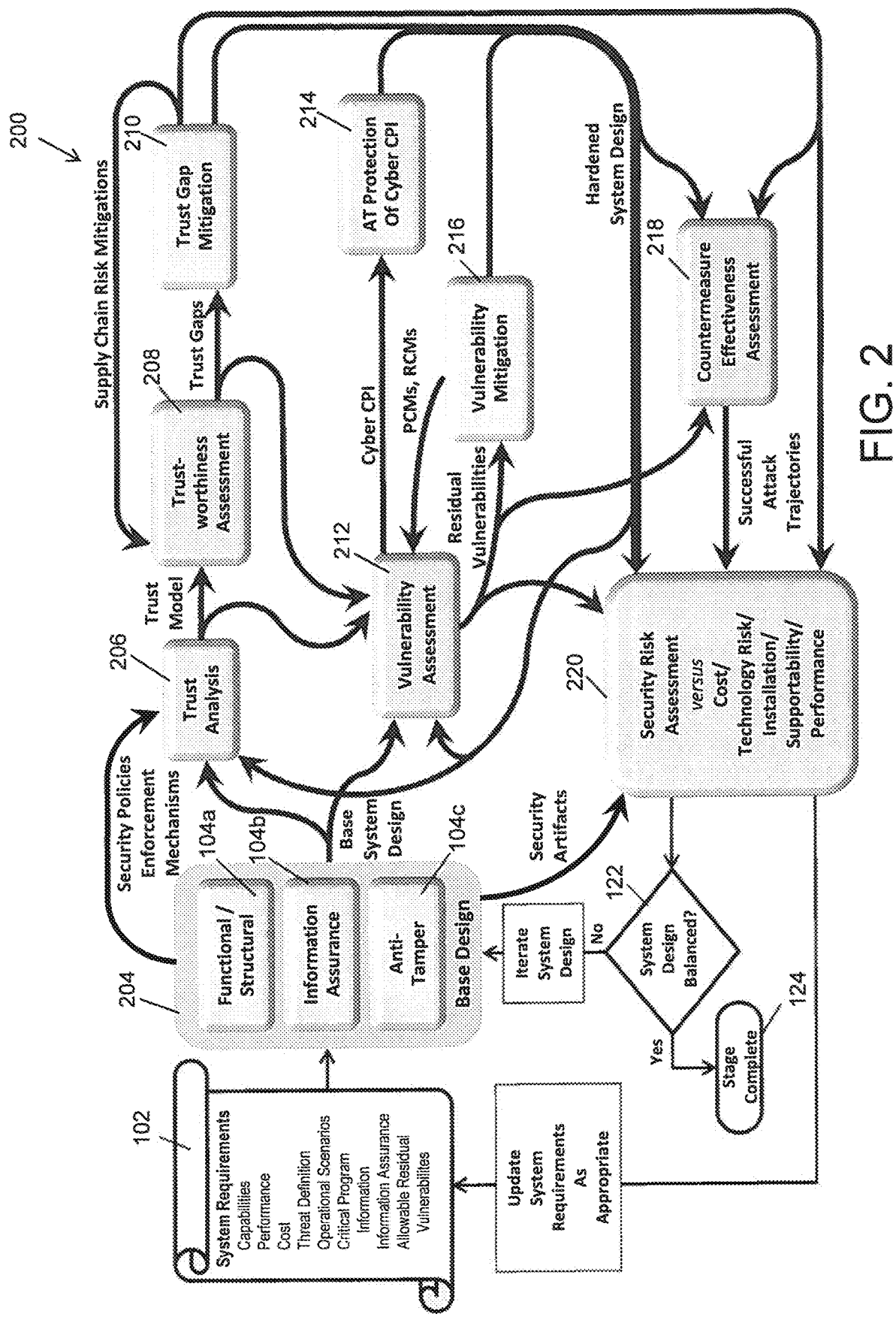
FIG. 2 is a block diagram of a system integrity assurance system for developing a performance based requirements specification.

Referring now to FIG. 2, a system integrity assurance system 200 for developing a performance based requirements specification is shown. Referring to the teachings of FIG. 1, as shown in block 102, a System Requirements Specification is developed and includes the characteristics as described in connection with FIG. 1. A base design module 204 such as a product development management (PDM) system is used by system designers working collaboratively to develop a base design to implement system requirements using existing engineering processes and assessment and authorization standards and stores functional/structural data

204a, information assurance (IA) data 204b and anti-tamper (AT) data 204c and their associated requirements. Once a preliminary base design is completed, a trust analysis module 206 is used to store information and data along with an associated trust score for each component or system element that a trust analysis was performed in accordance with the teachings of step 106 in FIG. 1. Next, a trustworthiness module 208 is used to store information and data from the trust analysis module 206 where a trustworthiness assessment is performed for each component or system element following the teachings of step 108 in FIG. 1 resulting in a trustworthiness score which is stored in the trustworthiness module 208.

As shown by step 210, trust gap mitigation is performed for selected system elements as determined by the respective trust score and trustworthiness score. Required changes are introduced into the system design to decrease the trust required or the trustworthiness is increased by mitigating supply chain issues. Any changes introduced to the system design are made to the base design data base in the base design module 204 and the changes undergo a new trust analysis and trustworthiness analysis with the new data added to the trustworthiness module 208. Any changes to the supply chain information that affects trustworthiness is also added to the trustworthiness module 208.

As described in connection with FIG. 1, after the trustworthiness assessment step 108 is completed, a vulnerability assessment step 112 is done. Vulnerability assessment identifies and documents a system's residual vulnerabilities based on the integrated threat and the results are stored in a vulnerability assessment module 212. The vulnerability assessment module 212 captures and stores information as to any identified residual vulnerabilities determined from the vulnerability assessment such that residual vulnerabilities can be mitigated by designing preventive and reactive countermeasures to reduce the number of residual vulnerabilities as shown in step 216 and by designing and applying anti-tamper techniques as shown in step 214 to critical data requiring protection to ensure countermeasure effectiveness. A countermeasure effectiveness assessment module 218 is used to store information with respect to the countermeasures applied to the information system and the assessment thereof to those countermeasures as described in connection with the countermeasure effectiveness assessment step 118 of FIG. 1.

A security risk assessment module 220 is used to capture and store information to assess the security risk associated with the remaining residual vulnerabilities to determine if such residual vulnerabilities are acceptable to protect critical data in the information system. If residual vulnerabilities are unacceptable, the process is repeated until the residual vulnerabilities are acceptable as shown in decision tree 122. As described above, this is a balancing effort between the cost of system design and the security risk. The process is then complete as shown in step 124.

It should now be appreciated a system integrity assurance system 200 according to the disclosure includes: a trust analysis module 206 to capture and store information, from a design specification for an information system having a functional and structural component, an information assurance component and an anti-tamper component, as to which components of the information system is trusted to enforce a security policy and to provide a respective trust score; a trustworthiness assessment module 208 to capture and store for each system element in the information system a trustworthiness assessment and to provide a respective trustworthiness score such that trust gap mitigation can be performed for selected system elements as determined by the respective trust score and trustworthiness score; a vulnerability assessment module 212 to capture and store information as to any identified residual vulnerabilities determined from a vulnerability assessment such that residual vulnerabilities can be mitigated by designing preventive and reactive countermeasures to reduce the number of residual vulnerabilities and by designing and applying anti-tamper techniques to critical data requiring protection to ensure countermeasure effectiveness; a countermeasure effectiveness assessment module 218 to assess the countermeasures applied to the information system; and a security risk assessment module 220 to capture and store information to assess the security risk associated with the remaining residual vulnerabilities to determine if such residual vulnerabilities are acceptable to protect critical data and technology in the information system and to provide a list of needed changes to the system requirements to control the vulnerabilities of the information system.

Referring now to FIG. 4, a computer 300 includes a processor 302, a volatile memory 304, a non-volatile memory 306 (e.g., hard disk) and the user interface (UI) 308 (e.g., a graphical user interface, a mouse, a keyboard, a display, touch screen and so forth). The non-volatile memory 306 stores computer instructions 312, an operating system 316 and data 318. In one example, the computer instructions 312 are executed by the processor 302 out of volatile memory 304 to perform all or part of the processes described herein.

The processes and modules described herein are not limited to use with the hardware and software of FIG. 4; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the process 100 in FIG. 1 is not limited to the specific processing order of FIG. 1. Rather, any of the processing blocks of FIG. 1 may be re-ordered, combined or removed, performed in parallel or in serial, as necessary, to achieve the results set forth above.

The processing blocks associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

A number of embodiments of the disclosure have been described. Nevertheless, it will be understood that various modifications may be made without departing from the spirit and scope of the disclosure. Accordingly, other embodiments are within the scope of the following claims.

What is claimed is:

1. A method for developing an information system specification and corresponding system design comprising:
    performing, from a design specification for an information system having a functional and structural component, an information assurance component and an anti-tamper component, a trust analysis identifying which elements of the information system, the information system trusts to enforce a security policy and providing a trust score;
    performing for each system element in the information system a trustworthiness assessment and providing a trustworthiness score;
    performing mitigation to reduce a trust gap as determined from the trust score and the trustworthiness score;
    performing a vulnerability assessment to identify residual vulnerabilities determined from the vulnerability assessment;
    mitigating the residual vulnerabilities by designing preventive and reactive countermeasures to reduce the number of residual vulnerabilities;
    assessing the countermeasures applied to the information system;
    assessing the security risk associated with any remaining residual vulnerabilities to determine if such residual vulnerabilities are acceptable to protect critical data and technology in the information system; and
    changing and updating system requirements for the information system as required by the designing preventive and reactive countermeasures step and the designing and applying anti-tamper techniques step.

2. The method recited in claim 1 wherein the trust score is determined by a severity rating times a dispersion rating attributed to that component.

3. The method recited in claim 2 wherein the severity rating is selected from the group of one, two and three.

4. The method recited in claim 2 wherein the dispersion rating is selected from the group of one, two and three.

5. The method recited in claim 1 wherein the trustworthiness score is selected from the group of low, medium and high.

6. The method recited in claim 1 wherein a trust gap is mitigated by decreasing the trust required by a design change.

7. The method recited in claim 1 wherein a trust gap is mitigated by increasing the trustworthiness of a component using supply chain risk mitigation.

8. The method recited in claim 1 wherein assessing the countermeasures includes determining countermeasure effectiveness objectively through successful attack trajectories.

9. The method recited in claim 1 comprising designing and applying anti-tamper techniques to protect cyber resident critical program information to ensure countermeasure effectiveness.

10. A system to apply system integrity assurance comprising:
    circuitry to include:
    a trust analysis module to capture and store information, from a design specification for an information system having a functional and structural component, an information assurance component and an anti-tamper component, as to which components of the information system the information system trusts to enforce a security policy and to provide a respective trust score;
    a trustworthiness assessment module to capture and store for each system element in the information system a trustworthiness assessment and to provide a respective trustworthiness score such that trust gap mitigation can be performed for selected system elements as determined by the respective trust score and trustworthiness score;
    a vulnerability assessment module to capture and store information as to any identified residual vulnerabilities determined from a vulnerability assessment such that residual vulnerabilities can be mitigated by designing preventive and reactive countermeasures to reduce the number of residual vulnerabilities and by designing and applying anti-tamper techniques to critical data requiring protection to ensure countermeasure effectiveness;
    a countermeasure effectiveness assessment module to assess the countermeasures applied to the information system; and
    a security risk assessment module to capture and store information to assess the security risk associated with any remaining residual vulnerabilities to determine if such residual vulnerabilities are acceptable to protect critical data and technology in the information system and to provide a list of needed changes to the system requirements to balance the vulnerabilities of the information system.

11. The system recited in claim 10 wherein the trust score is determined by a severity rating times a dispersion rating attributed to that component.

12. The system recited in claim 11 wherein the severity rating is selected from the group of one, two and three.

13. The system recited in claim 11 wherein the dispersion rating is selected from the group of one, two and three.

14. The system recited in claim 10 wherein the trustworthiness score is selected from the group of low, medium and high.

15. The system recited in claim 10 wherein trust gap mitigation is accomplished by decreasing the trust required by a design change.

16. The system recited in claim 10 wherein trust gap mitigation is accomplished by increasing the trustworthiness of a component using supply chain risk mitigation.

17. The system recited in claim 10 wherein to assess the countermeasures includes determining countermeasure effectiveness objectively through successful attack trajectories.

\* \* \* \* \*